United States Patent [19]

Donnelly

[11] 4,141,568
[45] Feb. 27, 1979

[54] CONVERTIBLE FLATBED TRUCK

[76] Inventor: Frank R. Donnelly, 18 Burton La., Rockaway, N.J. 07866

[21] Appl. No.: 886,062

[22] Filed: Mar. 13, 1978

Related U.S. Application Data

[63] Continuation-in-part of Ser. No. 772,261, Jan. 25, 1977, Pat. No. 4,078,818.

[51] Int. Cl.² .................................................. B60P 3/42
[52] U.S. Cl. ................................. 280/415 B; 214/515
[58] Field of Search ........... 280/415 R, 415 A, 415 B, 280/405 R, 405 A, 407, 423 R, 438 R; 214/DIG. 12, 515; 296/35 A

[56] References Cited

U.S. PATENT DOCUMENTS

| | | | |
|---|---|---|---|
| 3,802,716 | 4/1974 | Wiers | 280/415 B |
| 4,078,818 | 3/1978 | Donnelly | 280/415 B |

Primary Examiner—Joseph F. Peters, Jr.
Assistant Examiner—R. Schrecengost

[57] ABSTRACT

A convertible vehicle is provided in which a flatbed unit can be used to convert a tractor into a flatbed truck when the tractor is not used for towing a trailer unit.

8 Claims, 4 Drawing Figures

U.S. Patent  Feb. 27, 1979  4,141,568
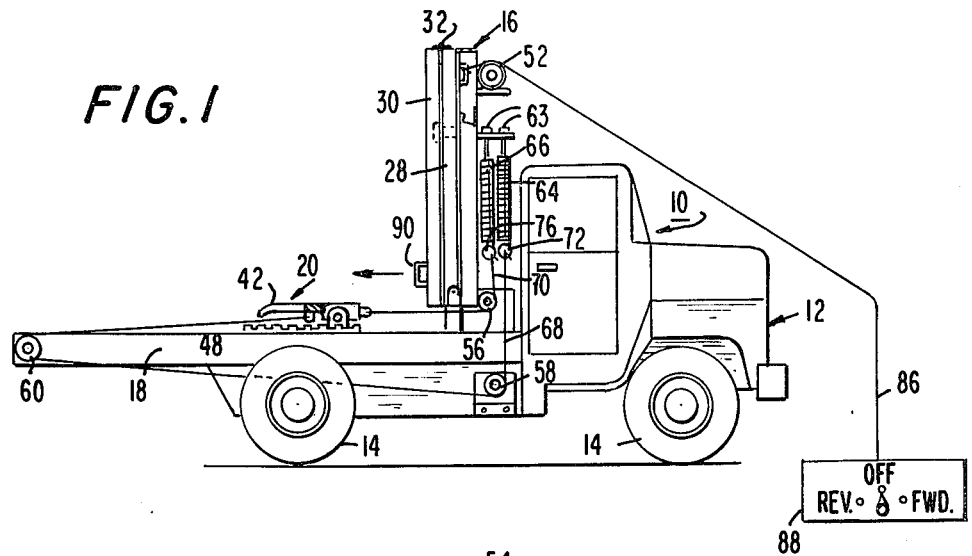
FIG. 1
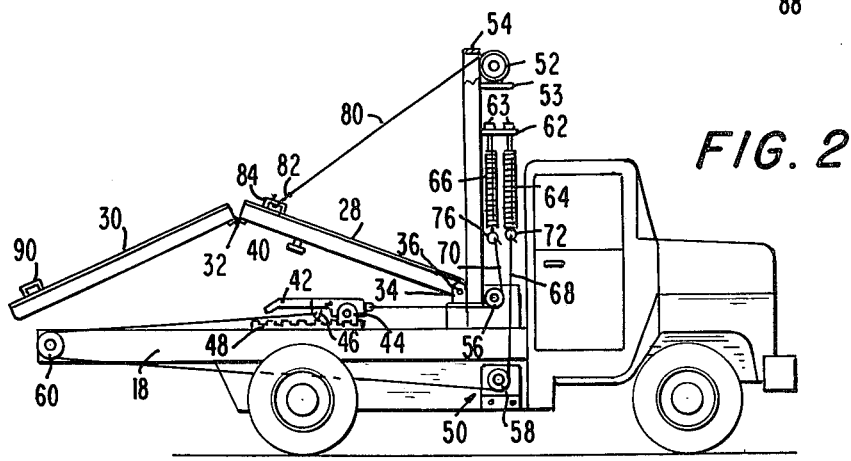
FIG. 2
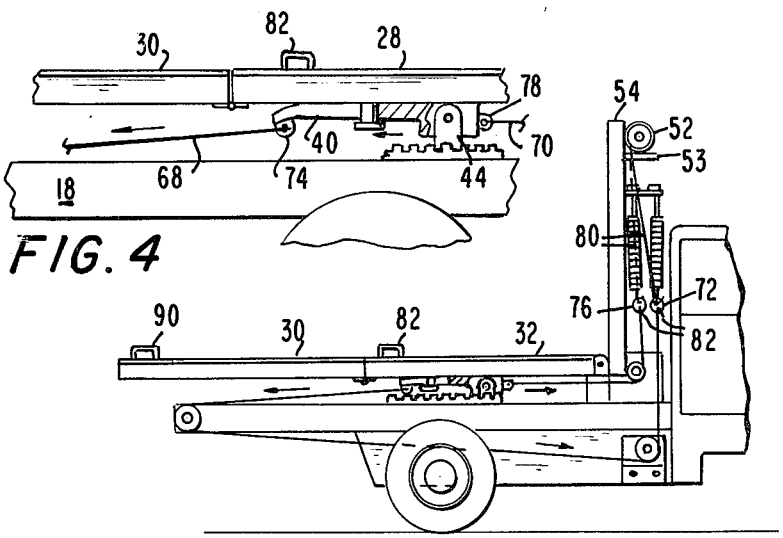
FIG. 4
FIG. 3

CONVERTIBLE FLATBED TRUCK

CROSS REFERENCE TO RELATED APPLICATION

This application is a continuation-in-part of applicant's copending application Ser. No. 772,261 filed on Jan. 25, 1977 now U.S. Pat. No. 4,078,818.

BACKGROUND OF THE INVENTION

In connection with the operation of large semi-trailer trucks, the tractor unit is used to transport the trailer unit to a distant point. When the trailer unit has been delivered, the tractor unit does not become a useful work vehicle, unless there is another trailer available which is to be transported. With the development of the portable flatbed unit of the present invention, after a trailer has been delivered, it is possible to convert the tractor unit into a flatbed truck. Thus, when the semi-trailer truck has reached its destination and the trailer has been disembarked, it is possible to convert the vehicle to a flatbed truck either for local hauling or long distance hauling. In this manner, the likelihood of a tractor unit having to be transported a long distance without a load is substantially diminished.

The present invention represents an improvement over the portable flatbed truck of the copending application, in that the pulley system has been given added capabilities, and a motorized winch has also been incorporated. Accordingly, through the operation of the new pulley system, it is not only possible to move the flatbed sections but additionally, the fifth wheel can be moved into and out of engagement with the flatbed sections.

SUMMARY OF THE INVENTION

In accordance with illustrative embodiments demonstrating features and advantages of the present invention, there is provided a convertible vehicle. A wheel supported tractor is provided which is capable of interconnection with a flatbed unit. The tractor unit is provided with a fifth wheel coupler which is formed with a slot. A pin is mounted downwardly on the flatbed unit, such that the pin can be received in the slot for connecting and disconnecting the flatbed unit from the tractor unit. The flatbed unit includes forward and rear slabs coupled together for folding movement, and the forward slab is foldably mounted on the tractor. A pulley system is mounted on the tractor for connection with the flatbed unit and fifth wheel coupler. When the fifth wheel coupler is connected to the pulley system, the coupler can be moved into and out of engagement with the king pin. When the flatbed unit is connected to the pulley system, after the fifth wheel has been disengaged, the slabs can be folded together and pivoted into a stored position. Thus, the vehicle can be converted into either a flatbed truck or a semi-trailer truck.

BRIEF DESCRIPTION OF THE DRAWING

The above brief description, as well as further objects, features, and advantages of the present invention, will be more fully appreciated by reference to the following detailed description of a presently preferred but nonetheless illustrative embodiment in accordance with the present invention, when taken in connection with the accompanying drawing wherein:

FIG. 1 is a side elevational view of the present invention showing the flatbed unit in a folded position for the stored operating mode and the electrical control is also shown;

FIG. 2 is a side elevational view of the vehicle shown in FIG. 1, with the flatbed unit partially unfolded prior to entering into either the flatbed or stored operating modes;

FIG. 3 is a partial elevational view of the vehicle shown in FIG. 2, with the flatbed unit fully extended, and the fifth wheel coupler disengaged from the pin, and both modes of operation for the motor driven cable are shown by respective solid and broken line representations; and FIG. 4 is an enlarged partial elevational view of the vehicle shown in FIG. 2 with the flatbed section in the fully engaged position for the flatbed operating mode, with the fifth wheel coupler engaging the king pin.

DESCRIPTION OF THE PREFERRED EMBODIMENTS

With reference to FIG. 1, there is shown a convertible flatbed truck, generally designated by the reference numeral 10. The flatbed truck 10 includes a tractor unit 12, supported by the wheels 14, and a flatbed unit 16. The tractor unit 12 has a frame 18 on which there is mounted a conventional fifth wheel coupler 20.

The flatbed unit 16 is comprised of a forward slab 28 and a rear slab 30, which are coupled together by means of a pair of hinges 32. Mounted on either side of the frame 18 are brackets 34 for receiving a pair of removable pins 36 that are used to movably mount the forward slab 28 to the frame 18. A king pin 40 is secured to the bottom of the forward slab 28.

The fifth wheel coupler 20 represents a conventional movable fifth wheel system, with a plate 42 hinged to the frame 18 by means of a bracket 44. The plate 42 is formed with an open slot 46 for receiving the king pin 40. Forward and rearward movement of the coupler 20 on the frame 18 is achieved by a conventional track arrangement 48, which receives the bracket 44 in sliding engagement.

A pulley system 50 includes an electric motor driven winch 52 mounted on a shelf 53 which is secured to a rack 54, together with respective first idler wheel 56, second idler wheel 58, and third idler wheel 60, all of which are journalled on the frame 18. Mounted on a bracket 62 which is secured to the rack 54, by means of adjustment bolts 63, are two springs, 64 and 66. The pulley system 50 is provided with cables 68 and 70, which are entrained on the idler wheels 56, 58 and 60, such that the springs 64 and 66 maintain cables 68 and 70 in a non-slack condition. Since the springs 64 and 66 are in a normally tensioned state, the cables 68 and 70 will always be tightly positioned on the idler wheels 56, 58, and 60.

As best shown in FIG. 2, one end of the cable 68 is attached to an open ring 72 which is secured to the free end of spring 64 and entrained over the idler wheels 58 and 60, such that the other end of cable 68 can be attached to a hook 74 on the plate 42. The cable 70 is attached to an open ring 76 which is secured to the free end of spring 66 and entrained over idler wheel 56, such that the other end of cable 70 can be attached to a hook 78 on the plate 42. The motor driven reel of the winch 52 is provided with a drive line 80 and a hook 82, which is capable of being attached to a handle 84 on forward slab 28, open ring 72, or open ring 76.

As shown in FIG. 1, the motor driven winch 52 is provided with an extended electrical line 86 and control box 88. A handle 90 is also provided on the rear slab 30. The control box 88 and handle 90 serve to assist the operator in the conversion of the vehicle 10 to the flatbed and stored modes of operation, as will be more fully understood in accordance with a typical operating sequence of the flatbed truck 10, which will now be described.

By progressively inspecting the figures of the drawing, the conversion to and from flatbed operation of the truck 10 can be more fully appreciated. The first step in extending the flatbed unit 16 from the stored operating mode shown in FIG. 1, requires the operator to turn the switch of the control box 88 to the forward position and grasp the handle 90 to allow the slabs 28 and 30 to begin unfolding as shown in FIG. 2. When the slabs 28 and 30 have become completely unfolded as shown in FIG. 4, the hook 82 of the winch 52 can be disengaged from the handle 84 and then the hook 82 can be inserted in the open ring 72. By switching the control box 88 to the reverse position, the clockwise rotation of drive line 80 will bring the slot 46 of plate 42 into locking contact with the king pin 40 as shown in FIG. 4.

To fold the flatbed unit 16, the drive line is removed from open ring 72 and the hook 82 is engaged with open ring 76, as shown by the broken line representation in FIG. 3. Thus, by placing the switch of control box 88 in the reverse position, the clockwise rotation of drive line 88 will move the slot 46 of plate 42 out of locking engagement with the king pin 40, as shown in FIG. 3. It is then possible to remove hook 82 from open ring 76 and place it in handle 84 so that the folding of slabs 28 and 30 can follow through the partially folded position of FIG. 2 to the completely folded position of FIG. 1. Thus, the clockwise rotation of the winch 52 will result in the complete folding of the slabs 28 and 30 into the stored-operating mode. When the control box 88 is placed in the "OFF" position, the winch 52 is locked, thereby maintaining the slab 28 and 30 in the stored position.

By providing a pulley system 50 which incorporates springs 64, 66 that maintain the cables 68, 70 in a non-slack position, it is possible for the operator to effectively utilize the winch 52 to convert the vehicle 10 into and out of the flatbed mode of operation.

It can be appreciated that in accordance with the present invention, there has been provided a convertible flatbed truck 10, which is capable of operation either as a flatbed truck or as a semi-trailer truck. Accordingly, the flatbed unit 16 can be placed into and out of engagement with the fifth wheel coupler 20 and stored when not in use.

A latitude of modification, change, and substitution is intended in the foregoing disclosure, and, in some instances, some features of the invention will be employed without corresponding use of other features. Accordingly, it is appropriate that the appended claims be construed broadly and in a manner consistent with the spirit and scope of the invention herein.

What is claimed is:

1. A convertible vehicle comprising a wheel supported tractor capable of interconnection with a flatbed unit, a fifth wheel coupler formed with a slot and mounted on said tractor, a pin mounted on said flatbed unit, such that said pin can be received in said slot for connecting and disconnecting said flatbed unit from said coupler, said flatbed unit including a forward slab and a rear slab, first coupling means connecting said forward slab and rear slab for folding movement, second coupling means connecting said flatbed unit to said tractor, means on said tractor for connection with said flatbed unit, and said fifth wheel coupler such that when said fifth wheel coupler is connected with said means, said fifth wheel coupler is capable of movement into and out of engagement with said pin, and when said flatbed unit is connected to said means after disengagement of said fifth wheel unit, said forward and rear slabs are capable of being folded together and pivoted into a stored position on said tractor whereby said vehicle can be converted into either a flatbed truck or a semi-trailer truck.

2. A convertible vehicle according to claim 1, in which a driven line is provided for removable connection with said fifth wheel and also with said forward and rear slabs.

3. A convertible vehicle according to claim 1, in which said means on said tractor include a pair of compression springs with one end of each spring secured to said tractor, a pair of cables with one end of each cable secured to the free ends of each of said springs, and idler pulleys journalled on said tractor over which said cables are entrained, such that the free ends of said cables are attached in opposing relationship to said fifth wheel to maintain said cables in a non-slack condition.

4. A convertible vehicle according to claim 3, in which a motorized winch with a drive line is provided for removable connection with the free ends of each of said springs, and also with said forward slab.

5. A convertible vehicle according to claim 4, in which a bracket is mounted on said tractor, said compression springs include a first spring and a second spring mounted on said bracket, said idler pulleys include a first wheel journalled on said tractor in a position beneath and spaced apart from said first spring, a second wheel journalled on said tractor in a position spaced apart from said first wheel, and a third wheel journalled on said tractor in a position beneath and spaced apart from said second spring, a first cable attached to the free end of said first spring and tightly entrained over said first wheel and second wheel and secured to said fifth wheel coupler, and a second cable attached to the free end of said second spring and tightly entrained over said third wheel and secured to said fifth wheel coupler.

6. A convertible vehicle according to claim 5, in which said first spring and said second spring are provided with means positioned on said free ends for receiving said drive line.

7. A convertible vehicle according to claim 6, in which said means on the free ends of said first spring and second spring include O-rings integrally formed on said free ends, such that said drive line can be respectively engaged with either of said O-rings to move said fifth wheel into and out of engagement with said pin.

8. A convertible vehicle according to claim 7, in which means are provided on said forward slab for receiving said drive line for folding and unfolding said flatbed unit when said pin is disengaged from said fifth wheel.

* * * * *